US012039080B2

(12) United States Patent
Hwang

(10) Patent No.: US 12,039,080 B2
(45) Date of Patent: Jul. 16, 2024

(54) METHOD AND SYSTEM FOR PROVIDING PRIVACY IN VIRTUAL SPACE

(71) Applicant: Piamond Corp., Busan (KR)

(72) Inventor: Doo Geon Hwang, Busan (KR)

(73) Assignee: PIAMOND CORP., Busan (KR)

( * ) Notice: Subject to any disclaimer, the term of this patent is extended or adjusted under 35 U.S.C. 154(b) by 0 days.

(21) Appl. No.: 18/174,176

(22) Filed: Feb. 24, 2023

(65) Prior Publication Data
US 2023/0334170 A1   Oct. 19, 2023

Related U.S. Application Data

(63) Continuation of application No. 17/828,680, filed on May 31, 2022, now Pat. No. 11,630,916.

(30) Foreign Application Priority Data
Apr. 14, 2022  (KR) .......................... 10-2022-0046154

(51) Int. Cl.
  *G06F 21/62*  (2013.01)
  *G06T 19/00*  (2011.01)
(52) U.S. Cl.
  CPC ........ *G06F 21/6245* (2013.01); *G06T 19/003* (2013.01)
(58) Field of Classification Search
  CPC ........................ G06F 21/6245; G06T 19/003
  See application file for complete search history.

(56) References Cited

U.S. PATENT DOCUMENTS

| | | | | | |
|---|---|---|---|---|---|
| 5,689,669 | A | * | 11/1997 | Lynch .................. | G06F 3/0481 715/848 |
| 6,002,853 | A | * | 12/1999 | de Hond ............... | G06F 16/954 709/219 |
| 6,079,982 | A | * | 6/2000 | Meader .................. | A63F 13/54 434/30 |
| 6,119,147 | A | * | 9/2000 | Toomey ............... | G06Q 10/109 719/329 |
| 6,179,619 | B1 | * | 1/2001 | Tanaka .................... | A63G 7/00 472/60 |
| 6,219,045 | B1 | * | 4/2001 | Leahy ..................... | H04L 67/10 709/204 |
| 6,243,091 | B1 | * | 6/2001 | Berstis ................ | G06F 3/04815 715/205 |
| 6,271,843 | B1 | * | 8/2001 | Lection .................. | G06T 15/00 715/848 |
| 6,362,817 | B1 | * | 3/2002 | Powers .................. | G06T 17/00 345/428 |
| 6,396,522 | B1 | * | 5/2002 | Vu ...................... | G06F 3/04845 715/848 |
| 6,414,679 | B1 | * | 7/2002 | Miodonski ............. | G06T 13/00 707/999.005 |

(Continued)

FOREIGN PATENT DOCUMENTS

KR   10-2002-0007892   10/2003

*Primary Examiner* — Nicholas Augustine
(74) *Attorney, Agent, or Firm* — NIXON PEABODY LLP

(57) ABSTRACT

Disclosed are a method and system for providing privacy in a virtual space. The method of providing privacy in a virtual space includes setting a privacy distance for guaranteeing a personal space of a user agent in a virtual space, and filtering information exposable to the user agent in the virtual space based on the privacy distance.

15 Claims, 17 Drawing Sheets

(56) References Cited

U.S. PATENT DOCUMENTS

| | | | | |
|---|---|---|---|---|
| 6,570,563 | B1* | 5/2003 | Honda | A63F 13/352 |
| | | | | 345/473 |
| 6,573,903 | B2* | 6/2003 | Gantt | G06F 30/00 |
| | | | | 345/619 |
| 6,590,593 | B1* | 7/2003 | Robertson | G06F 3/04815 |
| | | | | 715/848 |
| 6,621,508 | B1* | 9/2003 | Shiraishi | G06F 3/0481 |
| | | | | 715/764 |
| 6,690,393 | B2* | 2/2004 | Heron | G06T 19/00 |
| | | | | 715/848 |
| 6,784,901 | B1* | 8/2004 | Harvey | H04L 67/02 |
| | | | | 715/848 |
| 6,961,055 | B2* | 11/2005 | Doak | A63F 13/63 |
| | | | | 345/677 |
| 7,119,819 | B1* | 10/2006 | Robertson | G06F 3/04815 |
| | | | | 715/848 |
| 7,382,288 | B1* | 6/2008 | Wilson | G08G 5/0021 |
| | | | | 340/972 |
| 7,414,629 | B2* | 8/2008 | Santodomingo | G06T 17/05 |
| | | | | 345/582 |
| 7,467,356 | B2* | 12/2008 | Gettman | G06Q 30/02 |
| | | | | 715/850 |
| 7,542,040 | B2* | 6/2009 | Templeman | G06T 13/40 |
| | | | | 345/474 |
| 7,653,877 | B2* | 1/2010 | Matsuda | G06F 16/957 |
| | | | | 463/32 |
| 7,663,625 | B2* | 2/2010 | Chartier | G06T 19/20 |
| | | | | 700/182 |
| 7,746,343 | B1* | 6/2010 | Charaniya | G06N 7/01 |
| | | | | 345/428 |
| 7,788,323 | B2* | 8/2010 | Greenstein | G06Q 10/10 |
| | | | | 715/744 |
| 7,804,507 | B2* | 9/2010 | Yang | H04N 13/344 |
| | | | | 345/633 |
| 7,814,429 | B2* | 10/2010 | Buffet | G06F 30/00 |
| | | | | 715/763 |
| 7,817,150 | B2* | 10/2010 | Reichard | G06T 15/20 |
| | | | | 715/705 |
| 7,844,724 | B2* | 11/2010 | Van Wie | H04L 67/131 |
| | | | | 709/227 |
| 9,244,533 | B2* | 1/2016 | Friend | G09B 21/009 |
| 9,696,795 | B2* | 7/2017 | Marcolina | G06T 17/10 |
| 9,996,797 | B1* | 6/2018 | Holz | G06F 3/0482 |
| 10,516,853 | B1* | 12/2019 | Gibson | H04N 7/157 |
| 2001/0018667 | A1* | 8/2001 | Kim | G06Q 30/0277 |
| | | | | 705/14.73 |
| 2002/0095463 | A1* | 7/2002 | Matsuda | G06F 16/957 |
| | | | | 709/204 |
| 2002/0113820 | A1* | 8/2002 | Robinson | G06F 16/954 |
| | | | | 715/764 |
| 2004/0113887 | A1* | 6/2004 | Pair | G09B 25/08 |
| | | | | 345/156 |
| 2004/0193441 | A1* | 9/2004 | Altieri | A63F 13/216 |
| | | | | 709/203 |
| 2005/0093719 | A1* | 5/2005 | Okamoto | G01C 21/3697 |
| | | | | 705/14.62 |
| 2005/0128212 | A1* | 6/2005 | Edecker | G06T 17/05 |
| | | | | 345/581 |
| 2008/0030429 | A1* | 2/2008 | Hailpern | G06T 7/73 |
| | | | | 345/8 |
| 2008/0125218 | A1* | 5/2008 | Collins | G06Q 90/00 |
| | | | | 463/31 |
| 2008/0235570 | A1* | 9/2008 | Sawada | G06Q 10/10 |
| | | | | 356/3 |
| 2008/0246693 | A1* | 10/2008 | Hailpern | G06T 7/246 |
| | | | | 345/8 |
| 2009/0076791 | A1* | 3/2009 | Rhoades | A63F 13/53 |
| | | | | 703/21 |
| 2009/0091583 | A1* | 4/2009 | McCoy | G06T 19/006 |
| | | | | 345/419 |
| 2009/0287728 | A1* | 11/2009 | Martine | G06Q 30/02 |
| | | | | 715/810 |
| 2009/0300528 | A1* | 12/2009 | Stambaugh | G06F 3/04817 |
| | | | | 715/764 |
| 2010/0070378 | A1* | 3/2010 | Trotman | G06Q 30/02 |
| | | | | 705/26.1 |
| 2010/0115428 | A1* | 5/2010 | Shuping | G06F 3/0481 |
| | | | | 715/277 |
| 2010/0205541 | A1* | 8/2010 | Rapaport | G06Q 30/02 |
| | | | | 715/753 |
| 2010/0214284 | A1* | 8/2010 | Rieffel | G06T 17/00 |
| | | | | 382/154 |
| 2010/0274567 | A1* | 10/2010 | Carlson | G06Q 40/02 |
| | | | | 235/487 |
| 2010/0274627 | A1* | 10/2010 | Carlson | G06Q 20/20 |
| | | | | 705/16 |
| 2011/0010636 | A1* | 1/2011 | Hamilton, II | G06Q 10/10 |
| | | | | 705/26.7 |
| 2011/0041083 | A1* | 2/2011 | Gabai | G06Q 10/00 |
| | | | | 715/753 |
| 2012/0249741 | A1* | 10/2012 | Maciocci | G06T 19/006 |
| | | | | 348/51 |
| 2013/0042296 | A1* | 2/2013 | Hastings | G06Q 50/184 |
| | | | | 726/1 |
| 2013/0174213 | A1* | 7/2013 | Liu | G06F 21/6245 |
| | | | | 726/1 |
| 2014/0082526 | A1* | 3/2014 | Park | H04L 65/403 |
| | | | | 715/757 |
| 2014/0282105 | A1* | 9/2014 | Nordstrom | G06F 3/016 |
| | | | | 715/753 |
| 2017/0185261 | A1* | 6/2017 | Perez | G06F 3/04845 |
| 2017/0243403 | A1* | 8/2017 | Daniels | G06T 19/006 |
| 2018/0095635 | A1* | 4/2018 | Valdivia | G02B 27/0093 |
| 2018/0129278 | A1* | 5/2018 | Luchinskiy | G06F 3/0483 |
| 2018/0131907 | A1* | 5/2018 | Schmirler | H04N 23/698 |
| 2018/0357472 | A1* | 12/2018 | Dreessen | G06V 20/49 |
| 2019/0087015 | A1* | 3/2019 | Lam | A63F 13/213 |
| 2019/0371067 | A1* | 12/2019 | Simari | G06T 19/20 |
| 2020/0104522 | A1* | 4/2020 | Collart | G06T 19/20 |
| 2020/0110928 | A1* | 4/2020 | Al Jazaery | G05B 19/042 |
| 2020/0117267 | A1* | 4/2020 | Gibson | G06F 3/011 |
| 2020/0117270 | A1* | 4/2020 | Gibson | G06F 3/011 |
| 2021/0008413 | A1* | 1/2021 | Asikainen | G06F 3/0304 |
| 2021/0041951 | A1* | 2/2021 | Gibson | G06T 7/74 |
| 2022/0070232 | A1* | 3/2022 | Young | G06T 19/003 |

\* cited by examiner

- Real-world Person(using video call),
- Web Object
- Game Environment
- Streaming Channel / Content
- and etc FIG. 13
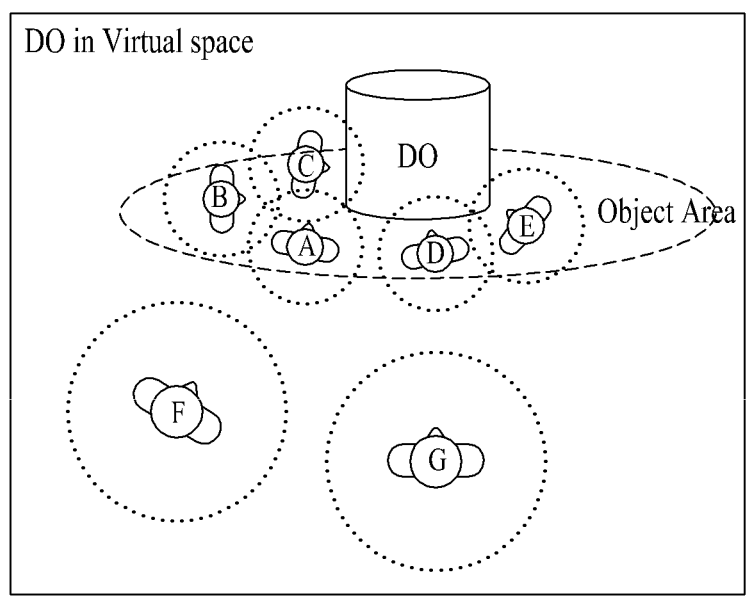
 — 903

FIG. 15
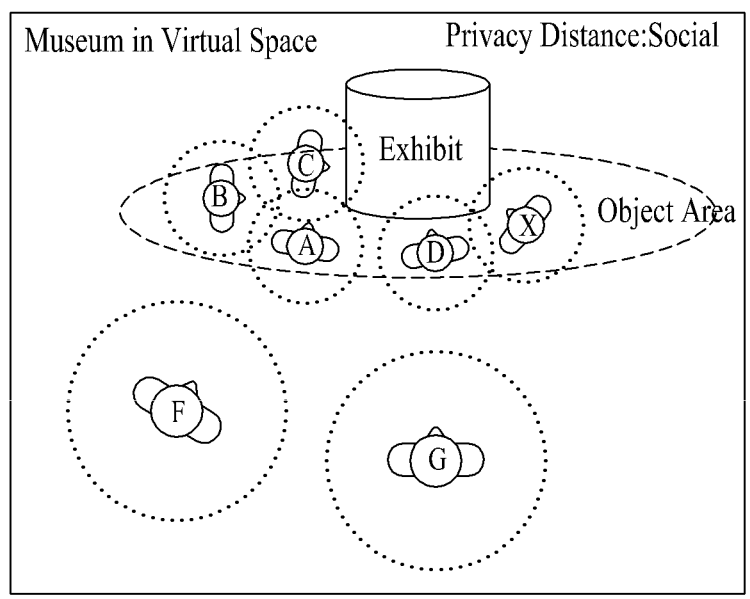
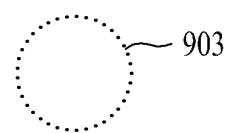

METHOD AND SYSTEM FOR PROVIDING PRIVACY IN VIRTUAL SPACE

CROSS-REFERENCE TO RELATED APPLICATION

This application is a continuation of U.S. patent application Ser. No. 17/828,680 filed on May 31, 2022, which has been allowed: U.S. patent application Ser. No. 17/828,680 is based on and claims priority under 35 U.S.C. 119 to Korean Patent Application No. 10-2022-0046154, filed on Apr. 14, 2022, in the Korean intellectual property office, the disclosures of which are hereby incorporated herein by reference in their entireties.

TECHNICAL FIELD

The following description relates to a technology for providing privacy in a virtual space.

BACKGROUND OF THE DISCLOSURE

In the existing browsing environment, each of an operator who operates a medium that provides a service and a $3^{rd}$ party operator, that is, an external operator, records and uses information on users by using its own cookies. For example, the $3^{rd}$ party operator exposes information suitable for a user in real time through the medium of the operator by using programmatic bidding or real time bidding (RTB) based on information obtained through cookies.

However, in the case of a virtual space, there is a problem in that it is difficult to effectively collect and confirm experience information of a user from the $3^{rd}$ party operator standpoint because all experiences of the user are performed in an operator-centered environment of a specific virtual space. Accordingly, in a conventional technology, the $3^{rd}$ party operator has limitations in that it simply inevitably exposes common information to many and unspecified users regardless of the activities of a user in a virtual space or provides related information to the user based on information other than the activities of the user in the virtual space, such as the profile of the user.

PRIOR ART DOCUMENT NUMBER

Korean Patent Application Publication No. 10-2002-0007892

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a method and system capable of providing privacy of an agent in a virtual space.

In an embodiment, a method performed by a computer device includes setting, by at least one processor included in the computer device, a privacy distance for guaranteeing a personal space of a user agent in a virtual space, and filtering, by the at least one processor, information exposable to the user agent in the virtual space based on the privacy distance.

According to an aspect, setting the privacy distance may include setting a social distance within which an agent permitted as the privacy distance interacts with the user agent in a permitted form or a personal distance within which the agent permitted as the privacy distance approaches an agent pre-configured by a user, in addition to a basic distance between agents which is provided in the virtual space.

According to another aspect, setting the privacy distance may include setting the privacy distance for restricting, from approaching the user agent, an agent not corresponding to a pre-defined relationship with a user.

According to still another aspect, setting the privacy distance may include setting the privacy distance permissible between agents based on at least one of a purpose of the virtual space and an age of a user.

According to still another aspect, setting the privacy distance may include setting the privacy distance in a gaze direction of the user agent based on a field of view (FoV) of the user agent.

According to still another aspect, setting the privacy distance may include setting a privacy distance grade and an application time in response to a privacy distance setting request received from a specific agent in the virtual space, selecting an agent corresponding to a privacy distance change target among agents in the virtual space, transmitting, to the selected agent, notification including the privacy distance grade and the application time, and applying the privacy distance grade and the application time to an agent responding to the notification within the privacy distance of the virtual space.

According to still another aspect, filtering the information exposable to the user agent may include performing deactivation processing on adjacent agents within the privacy distance based on a gaze direction of the user agent.

According to still another aspect, filtering the information exposable to the user agent may include moving a distance from the user agent instead of the deactivation with respect to an agent having a relationship with the user agent among the adjacent agents.

According to still another aspect, filtering the information exposable to the user agent may include exposing an agent having a relationship with the user agent in a visualization form among agents in the virtual space and exposing remaining agents in a non-visualization form.

According to still another aspect, filtering the information exposable to the user agent may include filtering an agent or object exposable to the user agent in the virtual space based on service target age information set in the virtual space along with the privacy distance.

According to still another aspect, the method may further include rendering, by the at least one processor, the user agent and a virtual space based on the user agent based on the filtered information.

There is provided a computer program stored in a computer-readable recording medium in order to execute the method in a computer device.

In an embodiment, a computer device includes at least one processor configured to execute computer-readable instructions included in a memory. The at least one processor is configured to set a privacy distance for guaranteeing a personal space of a user agent in a virtual space and to filter information exposable to the user agent in the virtual space based on the privacy distance.

According to embodiments of the present disclosure, privacy of an agent in a virtual space can be protected by providing a virtual space service to which a personal space (i.e., a distance between agents) of an agent has been applied.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 13 is an exemplary diagram for describing a situation in which a privacy distance between agents is guaranteed by taking a user-centered field of view (FoV) into consideration in an embodiment of the present disclosure.

FIG. 15 illustrates an example of the setting of a privacy distance in a museum in a virtual space in an embodiment of the present disclosure.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to a technology for providing privacy in a virtual space.

Embodiments including contents specifically disclosed in this specification can provide privacy of an agent in a virtual space.

Figure 1:
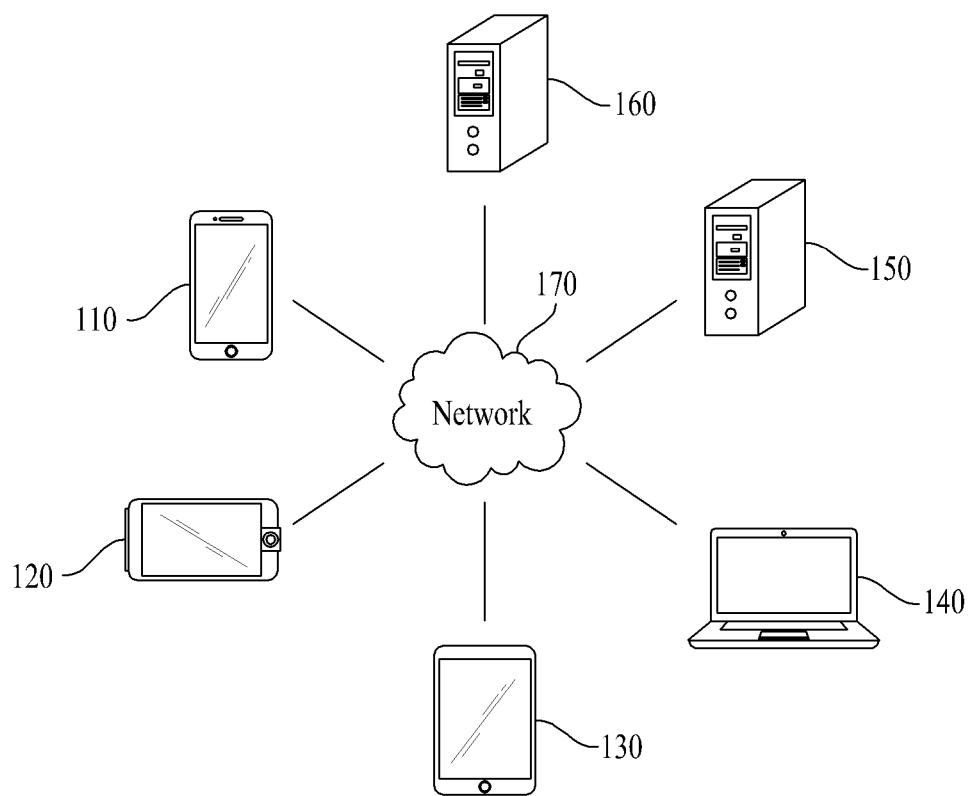
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment of FIG. 1 merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet PC, etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wireless communication between devices in addition to communication methods using communication networks (e.g., a mobile communication network, wired Internet, wireless Internet, and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides the plurality of electronic devices 110, 120, 130, and 140 connected through the network 170 with a service (e.g., a virtual space service).

Figure 2:
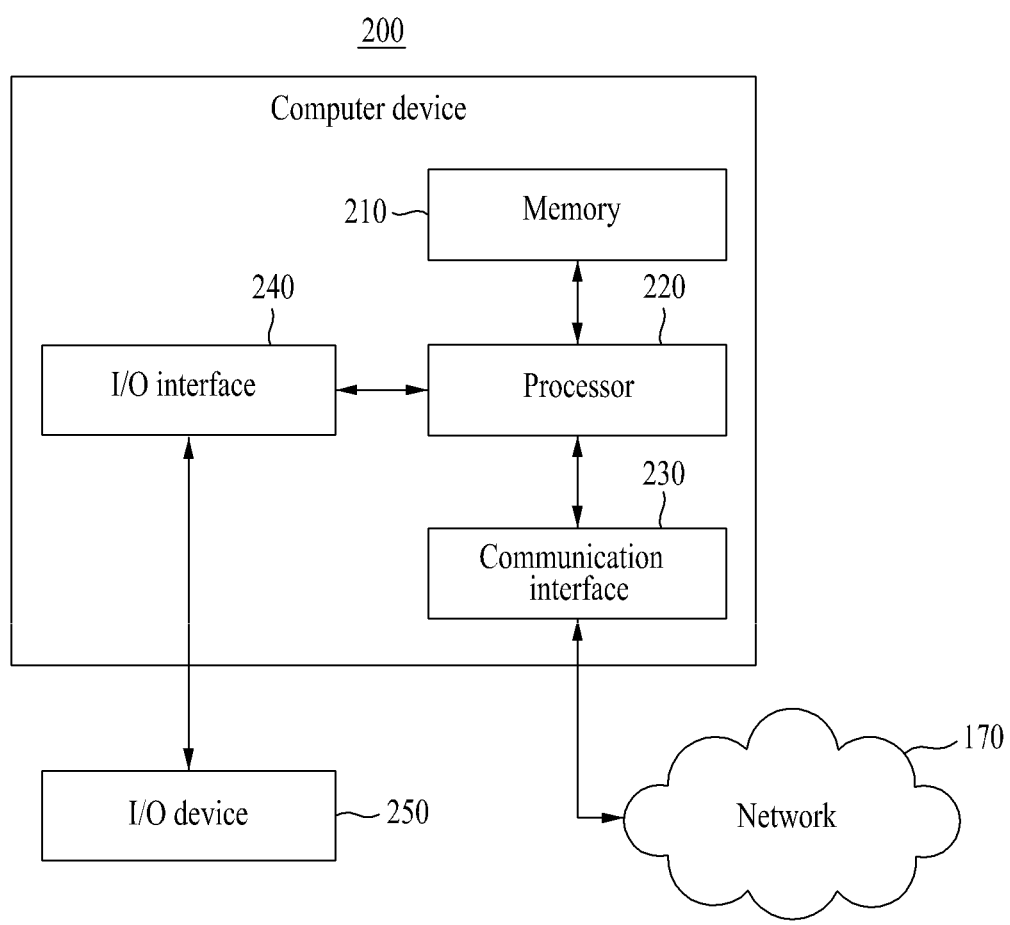
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130 and 140 or each of the servers 150 and 160 may be implemented as a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating system and at least one program code may be stored in the memory 210. Such software components may be loaded onto the memory 210 from a computer-readable recording medium separated from the memory 210. Such a separate computer-readable recording medium may include computer-readable recording media, such as a floppy drive, a disk, a tape, a DVD/CD-ROM drive, and a memory card. In another embodiment, software components may be loaded onto the memory 210 through the communication interface 230 not a computer-readable recording medium. For example, the software components may be loaded onto the memory 210 of the computer device 200 based on a computer program installed by files received over the network 170.

The processor 220 may be configured to process instructions of a computer program by performing basic arithmetic, logic and input/output (I/O) operations. The instructions may be provided to the processor 220 by the memory 210 or the communication interface 230. For example, the processor 220 may be configured to execute received instructions based on a program code stored in a recording device, such as the memory 210.

The communication interface 230 may provide a function for enabling the computer device 200 to communicate with other devices over the network 170. For example, a request, a command, data or a file generated by the processor 220 of the computer device 200 based on a program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (e.g., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. Furthermore, for example, the I/O interface 240 may be means for an interface with a device in which functions for input and output have been integrated into one, such as a touch screen. At least one of the I/O devices 250, together with the computer device 200, may be configured as a single device. For example, the I/O device 250 may be embodied in a form in which a touch screen, a microphone, a speaker, etc. are included in the computer device 200, like a smartphone.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

Figure 3:
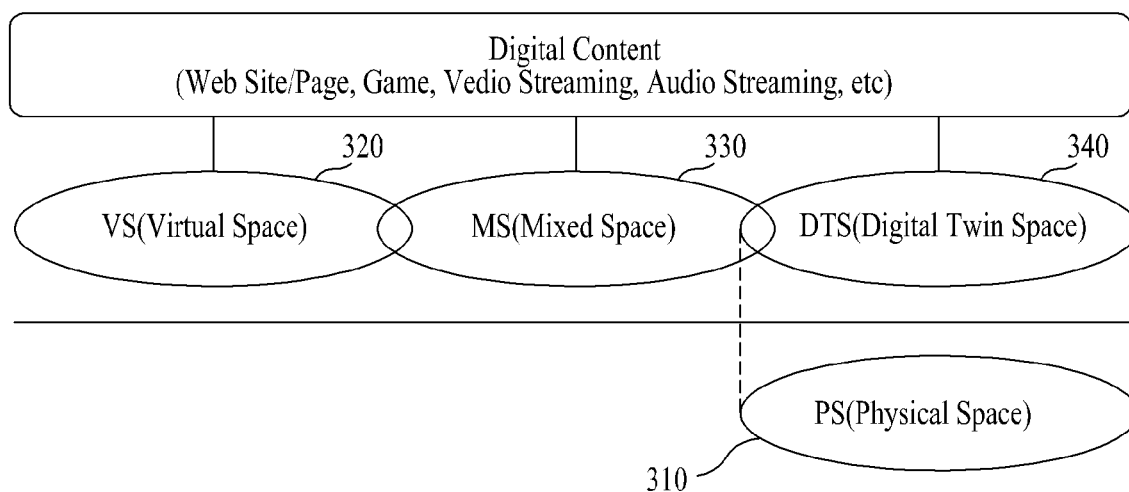
FIG. 3 is a diagram for describing spaces according to an embodiment of the present disclosure.

FIG. 3 is a diagram for describing spaces according to an embodiment of the present disclosure. FIG. 3 illustrates a physical space (PS) 310, that is, a space in a real world, and a virtual space (VS) 320, a mixed space (MS) 330, and a digital twin space (DTS) 340 that are spaces in a virtual world.

A space in a virtual world may be designed by a supplier (or operator) of the corresponding virtual world or may be constructed by a user or a $3^{rd}$ party operator, that is, an external operator. The space in the virtual world may be constructed in the form of the VS 320, the MS 330 and/or the DTS 340 depending on a characteristic of the space. The VS 320 may be a pure digital-based space capable of operating in conjunction with a cyber physical system (CPS). The DTS 340 may be a space operating in conjunction with a CPS as a virtual space based on a real world. The MS 330 may be a space in which the VS 320 and the DTS 340 are mixed. The MS 330 may be provided in a form to which an agent, that is, an object of a user, is adapted to an environment in the real world or may be provided in a form in which an environment in the real world is rendered in a virtual world.

A space in a virtual world is a concept of a basic virtual space in which an agent of a user can move, and may have a policy for the activities of an agent and the utilization and/or exposure of information for each space. If an agent of a user uses a service in a specific space in the virtual world, the agent needs to recognize that each of a piece of personal information and Privacy & Terms are present depending on the subject who provides the service.

A space in a virtual world may be variously generated and used depending on an operator or a user. To this end, a separate gate may be provided as an interface for a movement of an agent between spaces in the virtual world.

Figure 4:
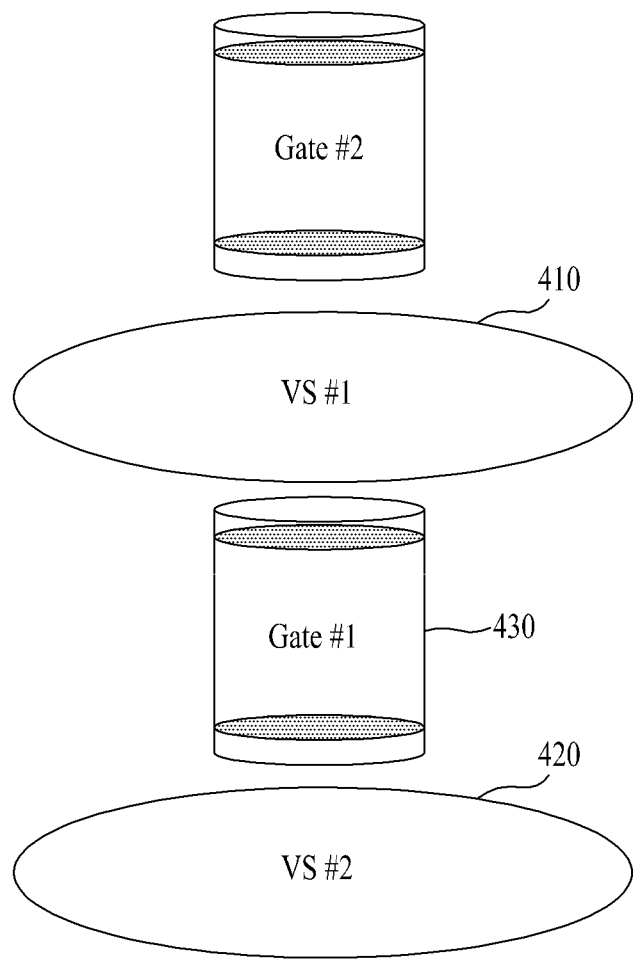
FIG. 4 is a diagram illustrating an example of a movement between spaces in a virtual world in an embodiment of the present disclosure.

FIG. 4 is a diagram illustrating an example of a movement between spaces in a virtual world in an embodiment of the present disclosure. FIG. 4 illustrates a gate #1 430 for a movement between a VS #1 410 and a VS #2 420, that is, two virtual spaces. In this case, the "gate" may be a basic interface that provides a movement between the spaces in the virtual world. The "gate" may control mobility between a space in a virtual world and a space in a non-virtual world in addition to a movement between spaces in the virtual world. For example, FIG. 4 illustrates that an agent in the VS #1 410 may also move, as a movement target, to a space in a non-virtual world, such as a web page, a streaming channel, streaming content, a game environment, or an actual offline video call. A method of distinguishing between spaces in a virtual world may be determined by an operator of a space in a corresponding virtual world.

An agent may mean a user or a program in a space in a virtual world. In this case, an agent as a program has a form of an artificial intelligence agent, and may be a virtual avatar or persona that is present instead of a $3^{rd}$ party operator. Physical characteristics of a space in a virtual world to which a corresponding agent belongs may be applied to an agent. A service profile configured in a space in a corresponding virtual world may be applied to the agent. Furthermore, an agent may have a characteristic based on information of a physical device that is used by a user. For example, an agent may have a viewing angle based on characteristics of a display of a physical device that is used by a user or may have a control characteristic according to a controller of a corresponding physical device.

Furthermore, a digital object to be described subsequently is a core element that configures world information in a space in a virtual world, and may collectively refer to objects that provide a mutual interaction function with an agent.

Figure 5:
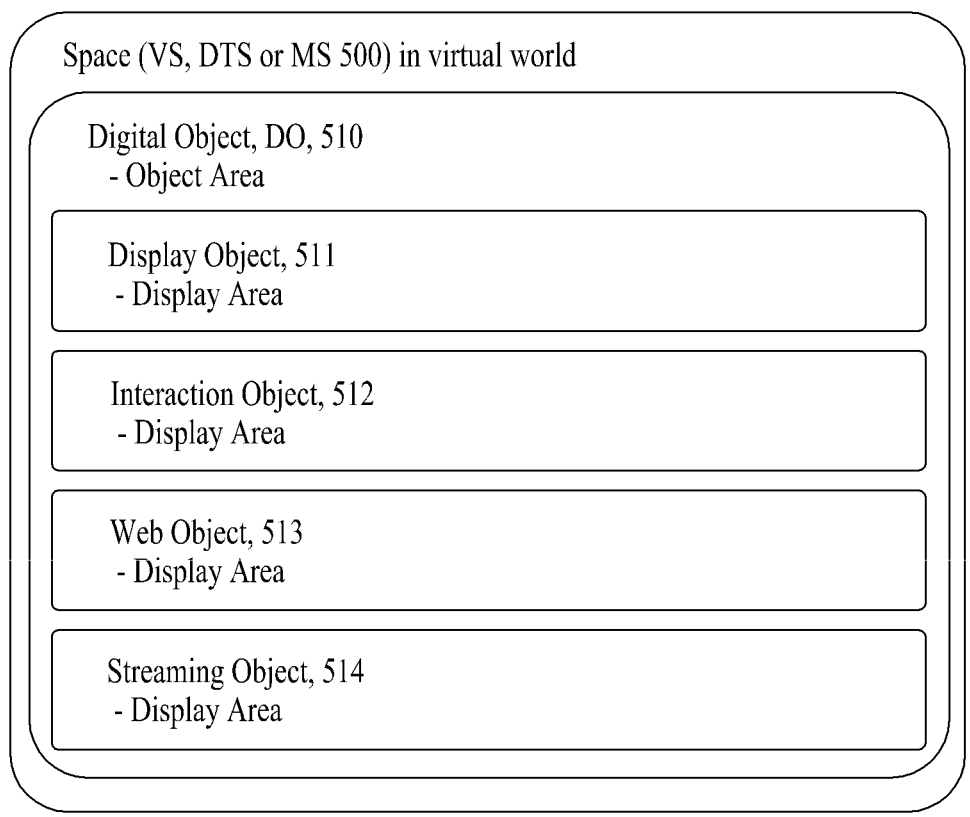
FIG. 5 is a diagram illustrating a relationship between elements which constitute a space in a virtual world according to an embodiment of the present disclosure.
Figure 6:
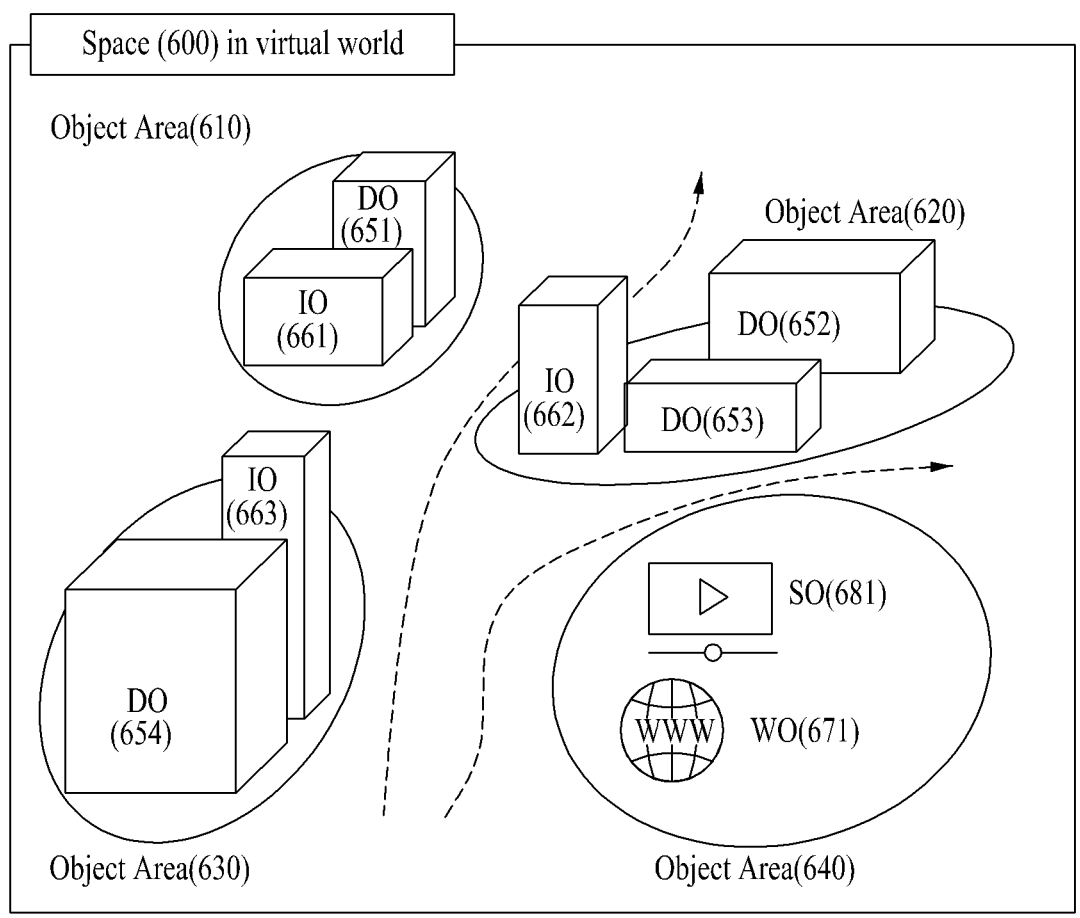
FIG. 6 is a diagram illustrating an example in which a digital object is constructed in a space in a virtual world according to an embodiment of the present disclosure.

FIG. 5 is a diagram illustrating a relationship between elements which constitute a space in a virtual world according to an embodiment of the present disclosure. FIG. 6 is a diagram illustrating an example in which a digital object is constructed in a space in a virtual world according to an embodiment of the present disclosure.

FIG. 5 illustrates that a space 500 in a virtual world, such as the VS 320, the MS 330 and/or the DTS 340 described with reference to FIG. 3, may include a digital object 510. In this case, the digital object 510 may be formed in an object area (OA), that is, an area included in the space 500 in the virtual world. Furthermore, the digital object 510 may include a display object (DO) 511, an interaction object (IO) 512, a web object (WO) 513, and a streaming object (SO) 514. In this case, each of the DO 511, the IO 512, the WO 513, and the SO 514 may selectively include a display area for the display of content.

FIG. 6 illustrates an example in which digital objects are disposed in OAs 610 to 640 formed in a space 600 in a virtual world. In this case, the digital objects may include DOs 651 to 654 that are display objects, IOs 661 to 663 that are interaction objects, a WO 671 that is a web object and/or a SO 681 that is a streaming object. Dotted arrows 691 and 692 illustrated in FIG. 6 indicate a movable flow of an agent.

As in the example of FIG. 6, various forms of digital objects may be present in a space in a virtual world according to an embodiment of the present disclosure. Each of the digital objects may be generated on the basis of an agent according to a determined condition. In this case, the digital object may be generated in an OA. If a space in a virtual world has been simulated from a real world like a DTS (e.g., the DTS 340 in FIG. 3), a position of an OA may be determined based on a determined physical position in the real world. For example, if a specific shopping mall or historical site in the real world is virtualized, a position of an OA may be determined in a way to have the same construction as an actual position construction.

A display object (DO) may be an object exposed to a space in a virtual world in a spatial form (structural form), and may provide a simple control function to an agent. An interactive object (IO) may be exposed to a space in a virtual world in a spatial form, and may be an object having an interactive characteristic capable of an interaction with an agent. For example, the IO may provide various interaction characteristics with an agent. Furthermore, a web object (WO) may be an object having a form in which content on a web is exposed through a space in a virtual world. Furthermore, a streaming object (SO) may be an object having a form in which streaming content, such as video or audio, can be continuously exposed.

An object area (OA) may have a characteristic of a space in which a digital object, that is, a virtual object, may be generated in a space in a virtual world. A digital object present in the OA may basically have the following characteristics. Whether each of functions will be provided may be determined based on a contract between an owner of a digital object and an operation of a space in a virtual world.
1. An agent interlocking-related function
  1) An interaction function: a function for providing an interface which may be directly controlled by an agent
  2) A history function: a function capable of tracking and storing the visit of an agent and interaction-related information
  3) An interested information storage (Favorite/Like) function: a function capable of storing, by an agent, interested information for a digital object
  4) A follow me function: a function for making a digital object in an OA small windows or an icon so that the digital object follows the periphery of an agent 2. An external API interlocking-related function
  1) A function capable of sharing information on timing at which a digital object in a space in a virtual world is generated and terminated
  2) An interface function for providing, to the outside, agent-related information collected by digital objects in an OA
  3) An interface function for representing information on a DO or an IO by incorporating real world information (e.g., a function for representing information, such as order waiting in a real store, congestion in a store, or a parking condition)
3. A gate interlocking-related function
  1) A gate connection function: a function for connecting an agent to another VS or PS in a digital object present in an OA
4. A display area (DA)-related function
  1) A DA function: an area in which an owner of a digital object may expose content based on his or her intention, which may be exposed to an agent.
  2) A display content request function: a function capable of being supplied with external content through a real-time content control module A display object (DO) and an interaction object (IO) may be present in an OA as some of elements that constitute a space in a virtual world. The DO and the IO basically appear in a form displayed on a screen of a user, and may have a characteristic of a structure having a given standard. External information of the DO may be provided from an owner of the DO to the supplier side of a space in a virtual world, may use a template provided by the supplier side, or may be directly designed by using a preset tool. Furthermore, each of the DO and the IO may have a display area (DA) which may be directly controlled by an owner. Content exposed in the DA may be provided by an owner of a DO and/or the selection of an IO within a proper range based on a policy between an owner of the DO and/or the IO and the supplier of a space. The DA may individually have an exposure characteristic according to a viewing angle of an agent (perspective, or a characteristic for enhancement by neglecting perspective) and an interaction characteristic. Furthermore, each IO may have interactive characteristics which may be directly controlled by an owner of the IO. The IO may provide an interaction suitable for a situation of an agent based on interaction characteristic activation information of the agent. For example, if a user wears only a head mount display (HMD), an IO may provide an operation function having the same form as a DO. In contrast, if a user has a controller combined with an HMD, an IO may provide an interaction feature (e.g., grabbing, pulling, or drawing) with an agent provided in a space in a corresponding virtual world. Furthermore, for example, if a user has an additional motion recognition controller, a corresponding characteristic may be used. A DO may have basic control characteristics. Such basic control characteristics may include a basic control function of a space in a virtual world, which is constructed by the supplier side. For example, the basic control function may include a history configuration and/or an interested information construction.

Figure 7:
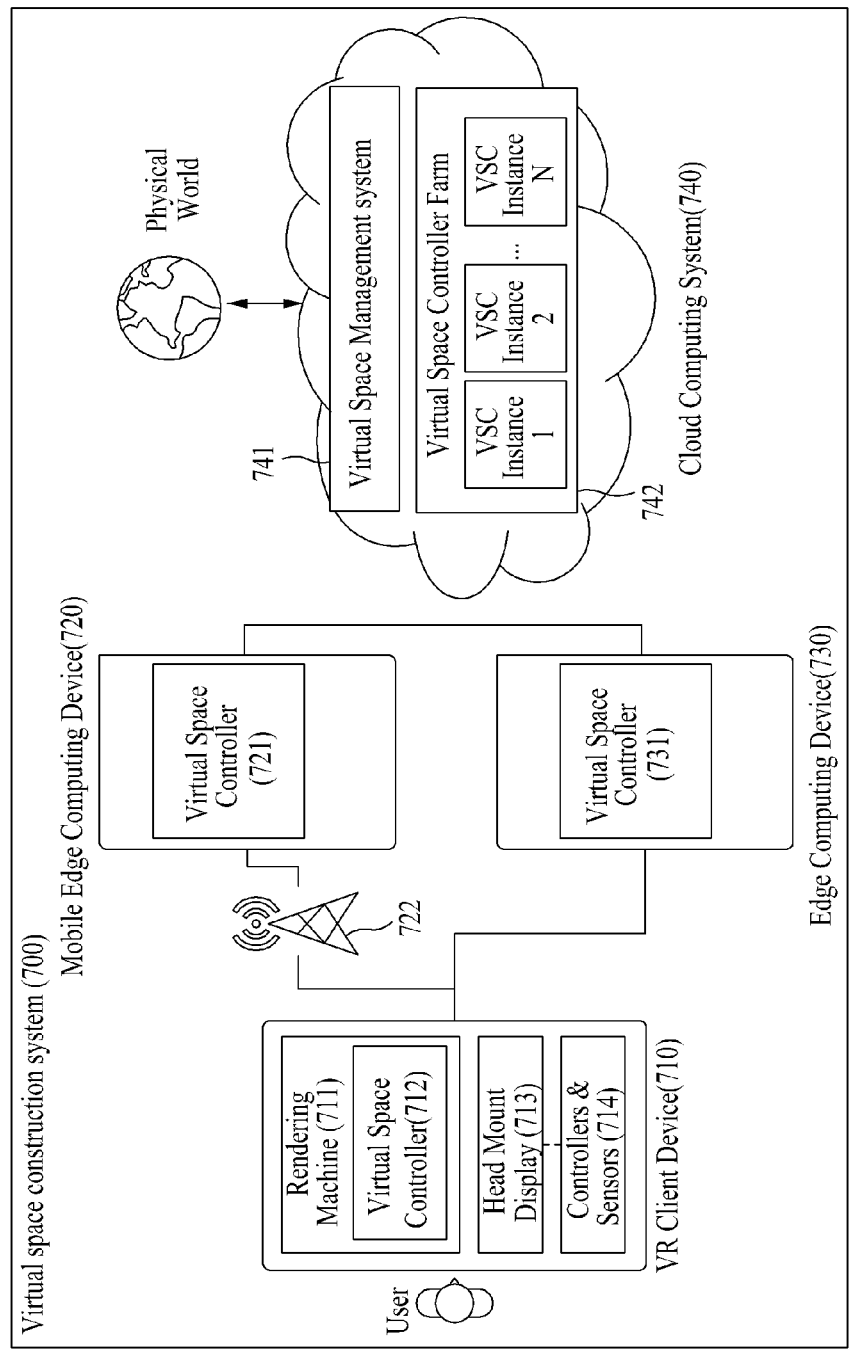
FIG. 7 is a diagram illustrating a schematic shape of a virtual space construction system according to an embodiment of the present disclosure.

FIG. 7 is a diagram illustrating a schematic shape of a virtual space construction system according to an embodiment of the present disclosure. A virtual space construction system 700 in FIG. 7 may include a virtual reality (VR) client device 710, a mobile edge computing device 720, an edge computing device 730, and a cloud computing system 740. Each of the VR client device 710, the mobile edge computing device 720, the edge computing device 730, and the cloud computing system 740 may be embodied through the computer device 200 described with reference to FIG. 2. It may be easily understood that the cloud computing system 740 may be embodied by two or more computer devices 200.

The VR client device 710 may be a physical device for displaying a space in a virtual world for a user. As illustrated in FIG. 7, the VR client device 710 may include a rendering machine 711, a virtual space controller (hereinafter referred to as a "VSC") 712 which may be included in the rendering machine 711, a head mount display (hereinafter referred to as an "HMD") 713, and controllers & sensors 714. The rendering machine 711 may display a space in a virtual world on the HMD 713 through the VSC 712. An output value of the controllers & sensors 714 may be used to control an agent of a user in a space in a virtual world and/or to interact with a digital object disposed in a space in a virtual world.

According to an embodiment, the VSC 712 may not be directly included in the VR client device 710 or the rendering machine 711, but may be included in the mobile edge computing device 720 or the edge computing device 730. For example, if the VR client device 710 of a user is a device having a level in which a space in a virtual world can be directly rendered, a space in a virtual world may be rendered by using the VSC 712 of the VR client device 710. In contrast, if the VR client device 710 of a user cannot directly render a space in a virtual world, the VR client device 710 may render a space in a virtual world through the VSC 721 of the mobile edge computing device 720 wirelessly connected thereto through an access point 722 or through a VSC 731 of the edge computing device 730 connected thereto in a wired way, and may display the rendered space on the HMD 713. If both the mobile edge computing device 720 and the edge computing device 730 are not supported, as will be described later, a space in a virtual world may be rendered by using a virtual space controller farm 742 included in the cloud computing system 740. The virtual space controller farm 742 may support that a user can display a rendered space in a virtual world on the HMD 713 by generating an instance for a VSC for a user. In this case, the VSCs 712, 721, and 731 may be VSC instances generated and provided by the cloud computing system 740 through the virtual space controller farm 742.

The VSCs 712, 721, and 731 may render a space in a virtual world so that content delivered in relation to the display area of a digital object can be displayed on the space in the virtual world for an agent. The VSCs 712, 721, and 731 may be generated for the VR client device 710 of a user corresponding to an agent by the cloud computing system 740 that constructs a space in a virtual world and provides a service. The VSCs 712, 721, and 731 may be launched on at least one of the VR client device 710, the mobile edge computing device 720, the edge computing device 730 or the cloud computing system 740, and may support the rendering of a space in a virtual world for the VR client device 710.

The VR client device 710 may be directly connected to the cloud computing system 740 or may be connected to the cloud computing system 740 through the mobile edge computing device 720 or the edge computing device 730, and may be provided with a service related to a space in a virtual world.

The cloud computing system 740 may be a system of an operator for constructing a space in a virtual world and providing a user with a service related to the space in the virtual world. As illustrated in FIG. 7, the cloud computing system 740 may include a virtual space management system 741 and the virtual space controller farm 742. The virtual space controller farm 742 may be embodied in a form included in the virtual space management system 741. The virtual space management system 741 is more specifically described with reference to FIG. 8.

Figure 8:
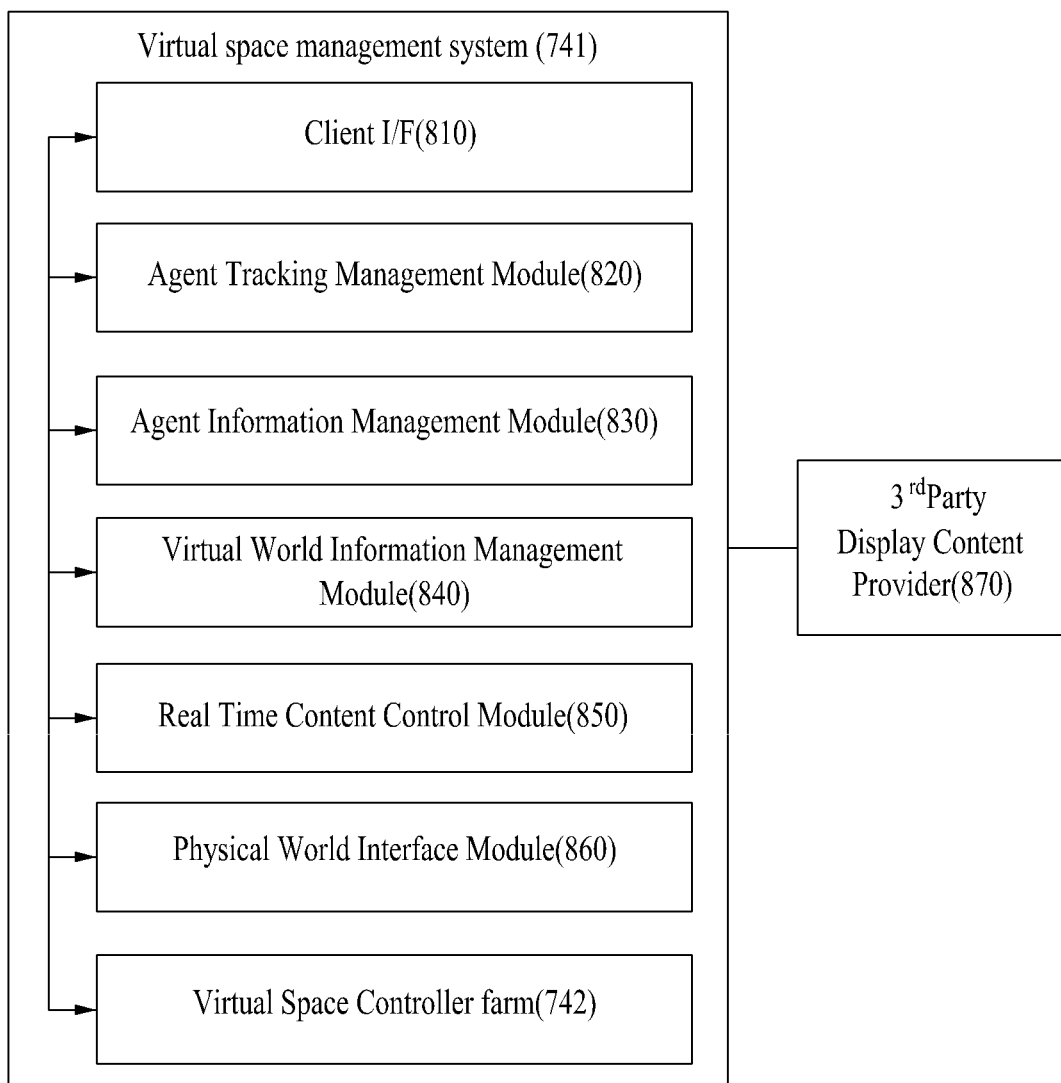
FIG. 8 is a block diagram illustrating an example of internal components of a virtual space management system according to an embodiment of the present disclosure.

FIG. 8 is a block diagram illustrating an example of internal components of the virtual space management system 741 according to an embodiment of the present disclosure. As illustrated in FIG. 8, the virtual space management system 741 according to the present embodiment may include a client interface (I/F) 810, an agent tracking management module 820, an agent information management module 830, a virtual world information management module 840, a real-time content control module 850, a physical world interface module 860, and the virtual space controller farm 742. The components of the virtual space management system 741 may be functional expressions of the processor 220 included in at least one computer device 200 that embodies the cloud computing system 740.

The client I/F 810 may provide a user interface for the VR client device 710. For example, in a process of a user being provided with a service for a space in a virtual world, which is provided by the cloud computing system 740, by using the VR client device 710, the client I/F 810 may provide various user interfaces through which the user can interact with the space in the virtual world.

The agent tracking management module 820 may track an agent that is disposed in a space in a virtual world and moves. Information obtained by tracking the agent may be stored in a tracking database (DB) in association with an identifier of the corresponding agent in real time. Tracking history information for the agent may be stored in a tracking history DB in association with the identifier of the agent.

The agent information management module 830 may store a profile of an agent and the consent of the agent. For example, the agent information management module 830 may store the profile of the agent in an agent profile DB in association with the identifier of the agent, and may store the contents of the consent of the agent in an agent consent DB in association with the identifier of the agent. In this case, the consent may include contents to personal information and Privacy & Terms.

The virtual world information management module 840 may manage information for a space in a virtual world. For example, the virtual world information management module 840 may store information for a policy of a space in a virtual world, virtual map information, position information of a space in a virtual world (e.g., GPS information for a space in a virtual world), information of a digital object disposed in a space in a virtual world, and may provide corresponding information in response to a request from another module.

The real-time content control module 850 may select content to be displayed in a space in a virtual world. For example, the real-time content control module 850 may select content to be displayed in a display area of a digital object configured in a virtual world space. To this end, the real-time content control module 850 may include a function for content bidding and a function for selecting content to be displayed. For example, the real-time content control module 850 may select content to be displayed in a display area based on bidding for a $3^{rd}$ party display content provider 870.

The physical world interface module 860 may provide a function for controlling a physical resource and an interface for a physical resource.

As described above, the virtual space controller farm 742 may generate, provide, and manage an instance of a VSC in order to help the rendering of the VR client device 710.

The virtual space management system 741 may receive HMD information and control/censor information from the VR client device 710. The HMD information may include device motion tracking information of a 3-degrees of freedom (DoF) or a 6-DoF. In this case, the device motion tracking information may include motion tracking information for the VR client device 710. Furthermore, the HMD information may include user information from the VR client device 710. For example, the user information may include the rotation of the head of a user, a movement of the body of a user, or FoV information of a user. Furthermore, the HMD information may include rendering-related information, such as rendering delay or a temperature. The control/censor information may include information for a movement of the body of a user, a key event, or real-time controller information, such as a movement.

Hereinafter, detailed embodiments of a method and system for providing privacy in a virtual space are described.

There is a need for a distance between agents for protecting privacy of an agent in a virtual space.

Figure 9:
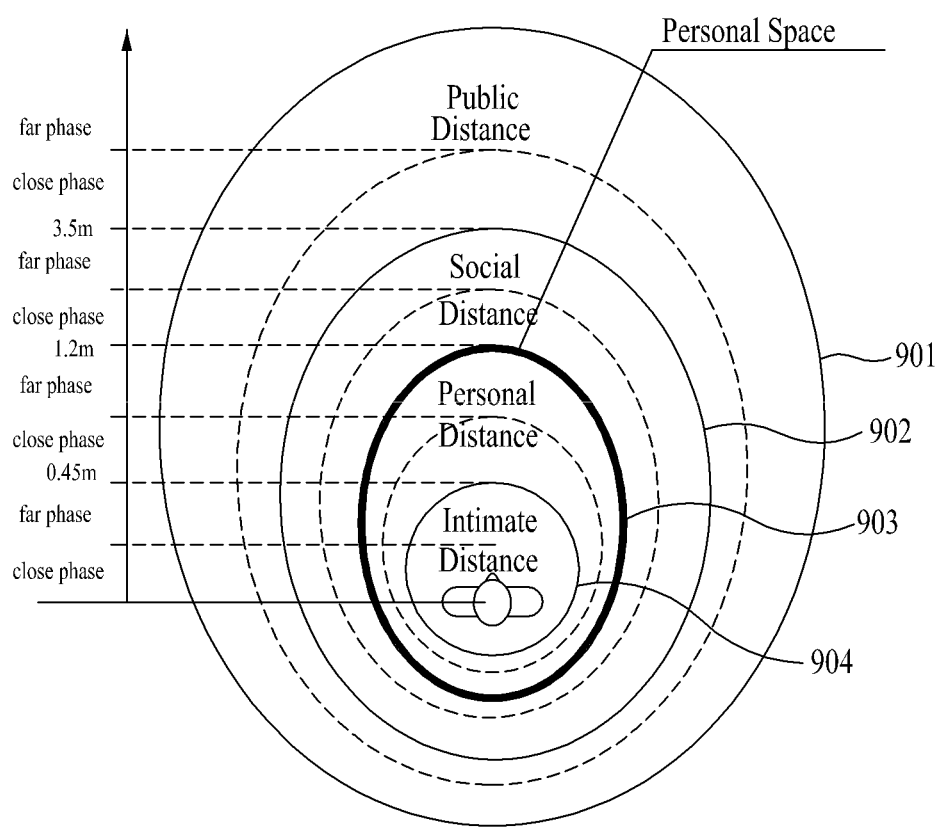
FIG. 9 is a diagram illustrating an example of a personal space defined in a virtual space in an embodiment of the present disclosure.

FIG. 9 is a diagram for illustrating a personal space defined in a virtual space in an embodiment of the present disclosure.

Referring to FIG. 9, a basic value in a VS may be defined as a public distance 901, and may construct a more intimate space with permission from a VS administrator (Admin). In particular, in a space having a social level or higher, if followability between specific agents is strong through agent tracking, a VS system may give warning of the strong followability or may perform processing in a form that disappears from the FoV of an agent. For example, the VS system may forcedly change a social distance 902 into the public distance 901. Alternatively, as a specific agent moves along another agent for a given time, a function having a form in which an FoV cannot be put may be limited.

An operator that has constructed a VS for a business purpose may set a distance between agents in the corresponding space after a review of the VS operator for the distance for a business purpose. In this case, an agent present for a special business purpose may perform a configuration, such as approaching up to a personal distance 903 based on permission (in this case, an OA indicative of a business space corresponds to the social distance 902). Furthermore, an AI-based agent not a user may approach up to the personal distance 903 and provide a service if the agent is sufficiently identified by a user agent.

The public distance 901 and the social distance 902 are as follows.

TABLE 1

| Privacy Distance | Social (902) | Public (901) |
| --- | --- | --- |
| Characteristics | A common distance (e.g., a shopping mall or a theater) when a specific space is recognized. In the case of a voice, a procedure of checking a will to talk in a text or notification form. BGM in a corresponding space is exposed based on information set by an owner of the space. | A basic distance between agents in a common VS |
| Privacy Distance Level | An OA configured as "Social" | An OA configured as "Public" |
| Configuration between agents | (When an agent recognizes an OA) a special object agent may perform a permitted specific interaction with an agent based on the approval of the VS (a voice, etc.) in an OA having a special business purpose with respect to an agent present in a corresponding space. | A basic configuration between agents in a basic space in a VS |
| Configuration of OA | It may be provided by an owner of a corresponding space with permission from a VS. For a business purpose, a VS operator determines approval through an application. | A basic space of a common OA in a VS |

The personal distance 903 and the intimate distance 904 are as follows.

TABLE 2

| Privacy Distance | Intimate (904) | Personal (903) |
| --- | --- | --- |
| Characteristics | This is the most intimate space and may be overlapped with the body of an agent through an operation of the agent. Capable of an interaction according to a body movement. A voice is basically supported (may be performed in a dialogue form without separate notification). | A distance in which handshaking between agents is possible Capable of an interaction according to a body movement A voice has a procedure of checking a will to talk in a voice sound or text or notification form based on user's setting. |
| Privacy Distance Level | An OA configured as "Intimate" | An OA configured as "Personal (or Privacy)" |
| Configuration between agents | This is restricted to an agent previously configured as an intimate grade by an agent. In this case, a service agent may also approach an intimate distance upon user configuration based on AI in addition to a user agent | This is restricted to an agent previously configured as a personal grade by an agent (e.g., capable of interlocking based on information, such as a common friend list or a call list, a social graph of a social service network) |

TABLE 2-continued

| Privacy Distance | Intimate (904) | Personal (903) |
|---|---|---|
| Configuration of OA | This may be provided through a configuration with a VS with respect to an OA that requires privacy. This is provided in a basic function form up to a total of 4 persons like 1:3 upon extension into 1:1 to 1:N. A service may be in a form of discussion with a separate VS administrator if persons are to be additionally increased | This may be provided by an owner of a corresponding space with permission from a VS. In this case, density information, etc. is previously approved based on information on a maximum number of participants, etc. Permission may be determined based on corresponding information. Furthermore, the number of simultaneous persons who can enter an OA is restricted based on corresponding information. |

In actual VR, it is necessary to support information of the personal space in a form in which the personal space is limitedly exposed because up to an audible element in addition to a visual element can be controlled.

Figure 10:
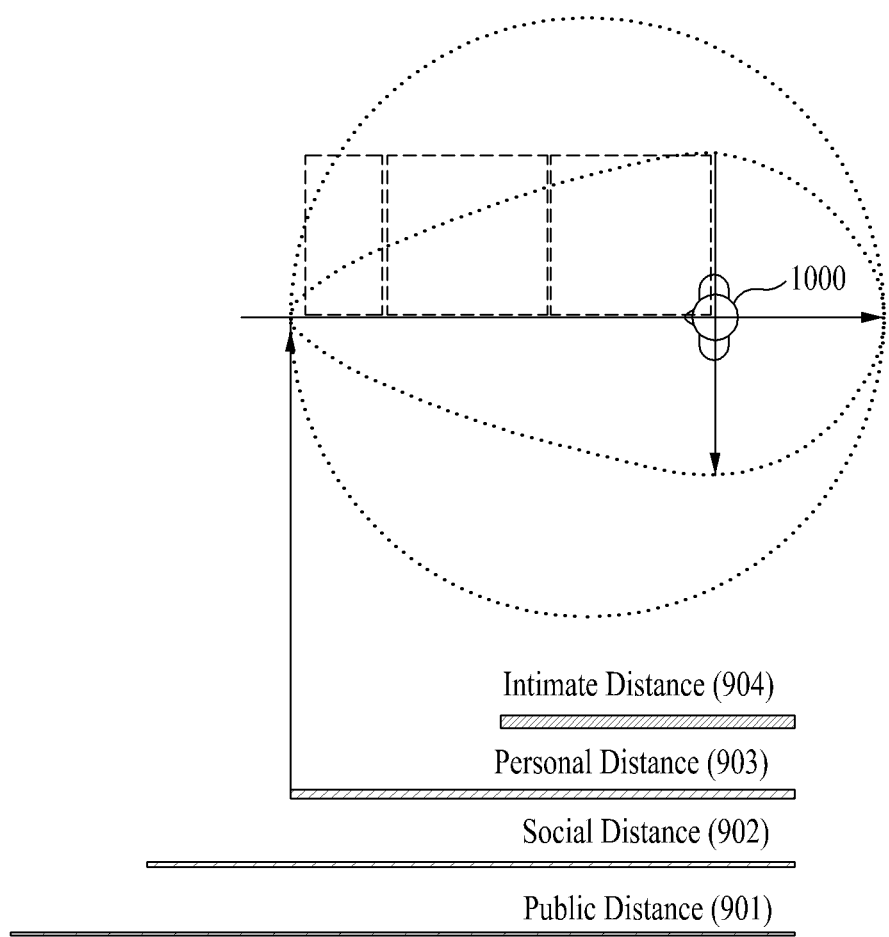
FIGS. 10 to 11 are exemplary diagrams for describing a personal space model in an embodiment of the present disclosure.

Referring to FIG. 10, in the case of a distance between agents, a public distance 901, a social distance 902, a personal distance 903, and an intimate distance 904 may be set based on a user-centered FoV by taking into consideration a gaze direction, a movement behavior, etc. of an agent.

A distance in a gaze direction of a user agent 1000 may be set to a maximum value and to a side position while drawing an ellipse based on the gaze direction. Accordingly, a more natural movement can be formed when multiple agents 1000 move in a crowded space. If an agent is not disposed within the FoV of the user agent 1000, the agent may be disposed at a distance closer to the user.

Figure 11:
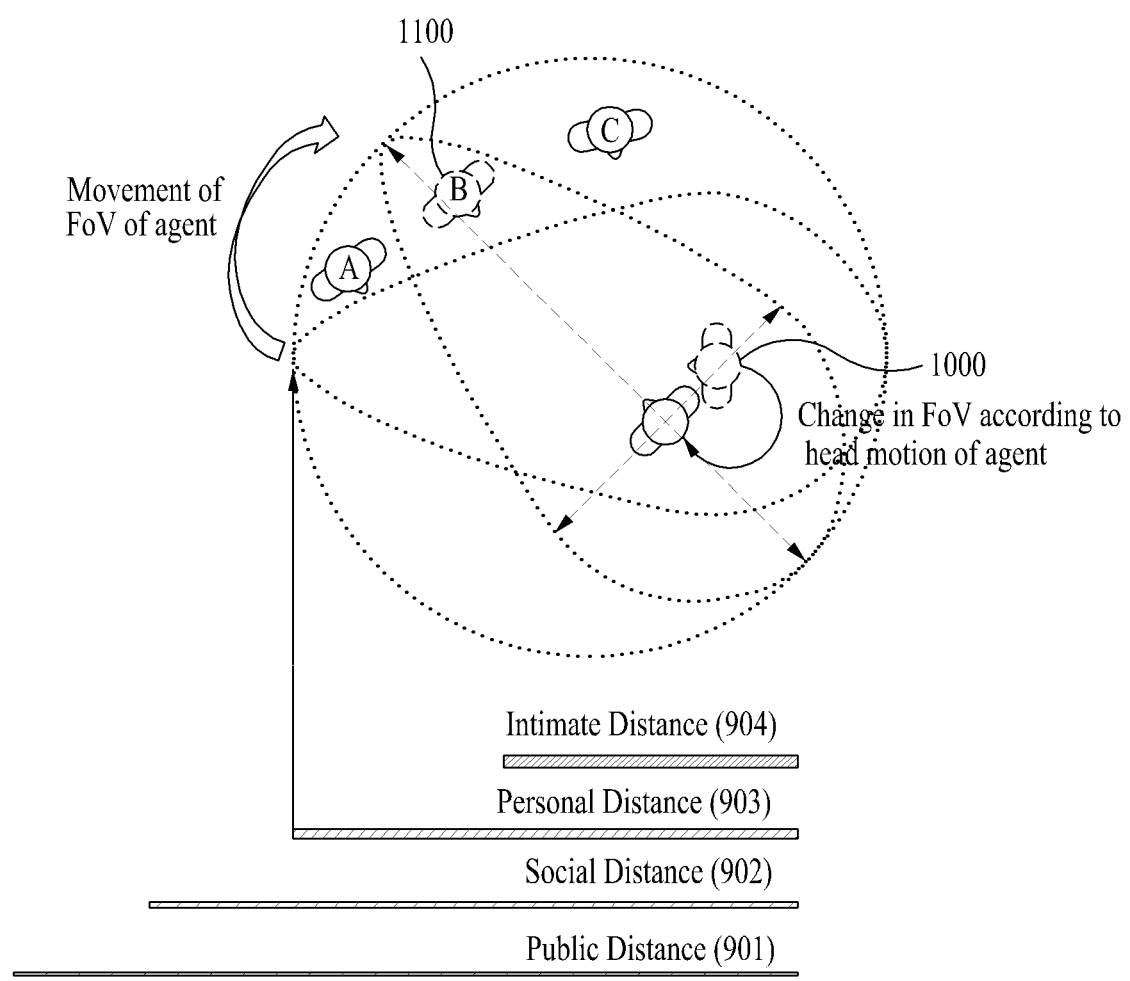

FIG. 11 is an exemplary diagram for describing a process of processing agents exposed at adjacent distances when an FoV is moved due to a position movement of an agent.

In the case of a distance between agents, a public distance 901, a social distance 902, a personal distance 903, and an intimate distance 904 may be set by taking into consideration a substantial user behavior, an FoV, etc.

In this case, it may be considered that a distance in a gaze direction is a maximum value and a surrounding position is an adjacent position based on the gaze direction of a user agent 1000. If the FoV of the user agent 1000 moves, the adjacent agent 1100 may be subjected to deactivation processing based on information configured in a corresponding OA. A criterion for the deactivation is to determine whether an interaction with the user agent 1000 is performed. If an interaction, such as a dialogue or a gesture, with the user agent 1000 is performed, a corresponding adjacent agent 1100 is not subjected to deactivation processing in the FoV of the user agent 1000. However, a user who has an association relationship (e.g., a social network relationship) with a user is not subjected to deactivation processing through a distance movement, etc. instead of deactivation.

Figure 12:
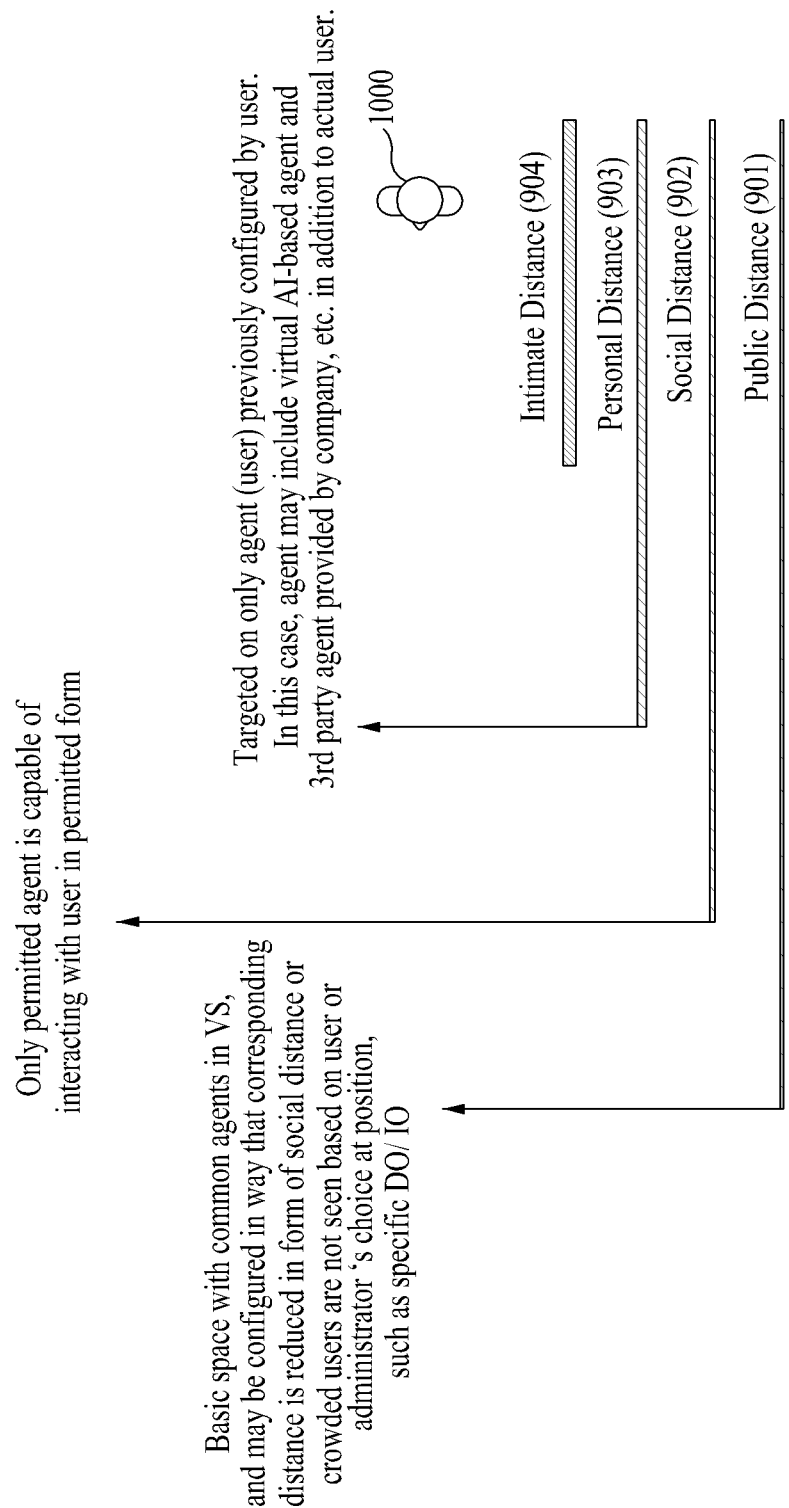
FIG. 12 illustrates an example of privacy control configurations by a user agent in an embodiment of the present disclosure.

FIG. 12 illustrates an example of privacy control configurations by a user agent in an embodiment of the present disclosure.

A privacy control function of a user agent 1000 may be provided based on user's setting or a space construction.

A public distance 901 is a basic space with common agents in a VS, and may be configured in a way that a corresponding distance is reduced in the form of a social distance 902 or crowded users are not seen based on a user or administrator's choice at a position, such as a specific DO/IO.

The social distance 902 may be set so that only a permitted agent can interact with a user in a permitted form.

A personal distance 903 is targeted on only an agent (user) previously set by a user. In this case, the agent may include a virtual AI-based agent and a 3$^{rd}$ party agent provided by a company, etc. in addition to an actual user.

In other words, the privacy control function may limit approach having a given distance or more if a relationship with a specific user is not previously defined. In this case, a distance of an agent (user) from an individual agent (user) may be set based on user's setting.

Furthermore, when a space is constructed in a VS, a corresponding VS administrator may determine a permission distance between agents based on a use purpose of the space or the age of a user. However, an agent having a special purpose in a permitted specific space (e.g., a casher in a store or a purpose of providing guidance to a specific space) may use a function, such as starting a conversation, even in the situation of the social distance 902 with a user within a given area of the specific space.

A minimum distance between agents in a common VS maintains the public distance 901.

However, as illustrated in FIG. 13, if multiple agents (e.g., a photo spot, a statue, a hot spot, and a shop entrance) are crowded at adjacent positions on the basis of a specific object, such as a DO or IO in a VS, an issue in which the personal distance 903 between user agents is invaded may occur.

In order to solve such a problem, if multiple agents are present in a specific OA, an agent B and an agent C that invade the personal distance 903 of an agent A are excluded from the FoV of the agent A on the basis of the agent A. An agent E that invades the personal distance 903 of an agent D on the basis of the agent D is excluded from the FoV of the agent D. If a DO is gazed on the basis of an agent F and an agent G, all the agents from the agent A to the agent E are present in a corresponding space.

Figure 14:
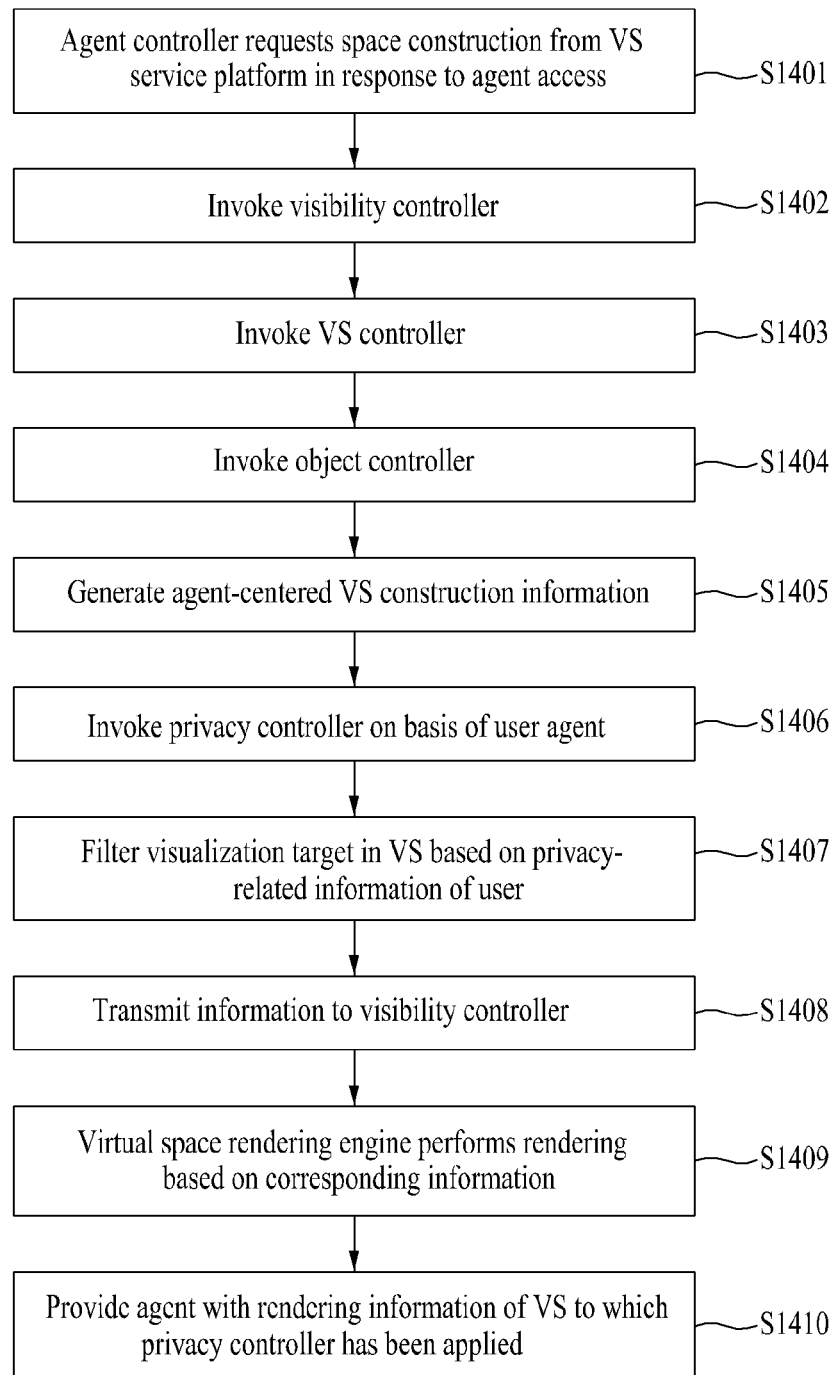
FIG. 14 is a flowchart illustrating a process of constructing a space to which privacy control in a virtual space has been applied in an embodiment of the present disclosure.

FIG. 14 is a flowchart illustrating a process of constructing a space to which privacy control in a virtual space (VS) has been applied in an embodiment of the present disclosure. A process of recognizing an object type according to the present embodiment may be performed by the computer device 200 that embodies a device (corresponding to the VR client device 710, the mobile edge computing device 720, or the edge computing device 730 described with reference to FIG. 7) capable of rendering a VS.

Referring to FIG. 14, in step S1401, the computer device 200 may request a space construction from a VS service platform through an agent controller in response to an agent access. The computer device 200 may request the space construction for providing a VS service to a user based on the generation of an agent and agent information according to the user access.

In step S1402, the computer device 200 may invoke a visibility controller in response to the space construction request from the agent controller. The computer device 200 invokes the visibility controller for an agent-centered space construction. In this case, a corresponding module may play a role to collect construction information from a related module and determine information to be finally exposed for the agent-centered rendering information construction.

In step S1403, the computer device 200 may invoke a VS controller (i.e., the VSC 712). The computer device 200 may obtain information of a VS through the VSC 712 by invoking the VSC 712 for obtaining the information of the VS.

In step S1404, the computer device 200 may invoke an object controller. The computer device 200 may collect and construct information for objects disposed in the VS through the object controller by invoking the object controller disposed in the VS.

In step S1405, the computer device 200 may generate agent-centered VS construction information. The computer device 200 may construct information necessary for the VS through the VSC 712 based on the information collected in the process S1402 to S1404.

In step S1406, the computer device 200 may invoke a privacy controller on the basis of a user agent. The computer device 200 may construct information on characteristics for privacy protection on the basis of information of the agent through the privacy controller. The computer device 200 generates information so that a flag or environment configuration information, such as exposable information based on a privacy distance or an age or exposable information based on user preference, can be constructed and filtered.

In step S1407, the computer device 200 may filter a visualization target in the VS based on privacy-related information of the user. The computer device 200 may re-construct visualization target information to be exposed to the VS based on the information constructed through the privacy controller.

In step S1408, the computer device 200 may transmit, to the visibility controller, the information reconstructed in step S1407. The computer device 200 may transmit the filtered VS construction information to the visibility controller. In this case, the visibility controller may transmit the VS construction information to a rendering module in order to visually provide the VS construction information to the user.

In step S1409, the computer device 200 may perform rendering on the VS based on the information received from the visibility controller through a virtual space rendering engine (e.g., the rendering machine 711). The space construction for providing a VS service to a user is requested based on the generation of the agent and the agent information according to the user access. In this case, visibility information for the agent around the user is filtered, and exposable information according to a privacy distance is configured.

In step S1410, the computer device 200 may provide the agent with rendering information of the VS to which the privacy controller is applied. The computer device 200 may render the user agent and agent-centered VS information as information to which privacy control has been applied.

Components for privacy filtering are as follows.

A privacy filter is applied to an agent or an object, and functions to filter information in an actual service.

As an example of the privacy filter, a privacy control filter may a role as a filtering function for controlling privacy information based on privacy-related configuration information of a user. In order for a user to be not seen as an agent having a form in which only the user can be identified in a VS, a mode, such as a default agent having a common value, may be configured. That is, the filtering function is a function for exposing only an agent having its own social relationship in a form in which the agent can be identified as an actual agent (i.e., a visualization target) and exposing the remaining agents as common agents having a non-visualization form, which are difficult to be identified.

As another example of the privacy filter, an age control filter may apply filtering based on an age. For example, in the case of a kindergarten area, an agent having a specific age or more cannot enter a corresponding OA (a conversation, etc. is also impossible), and requires an authentication process for formal admission. Filtering may be performed based on service target age information configured in a DO/JO.

As another example of the privacy filter, a privacy distance control filter corresponds to a filter for determining distance information between agents based on a privacy configuration or distance information between an agent and an object. The distance information may be described in a JSON form, and may include a distance relation between agents (e.g., Intimate, Personal, Social, or Public) and exception information based on a characteristic between objects. In this case, the characteristic between the objects may include a privacy distance (e.g., Social or Public) that is basically served when an agent enters a corresponding object.

Referring to FIG. 15, assuming that a basic privacy distance of a virtual space is set as the social distance 902 with respect to a museum in the virtual space, an agent X indicative of a docent needs to deliver voice information to a guide group having a specific session. To this end, the docent agent X may request each of user agents A, B, C, D, F, and G to configure a privacy distance as the personal distance 903 for a specific period within the museum.

Figure 16:
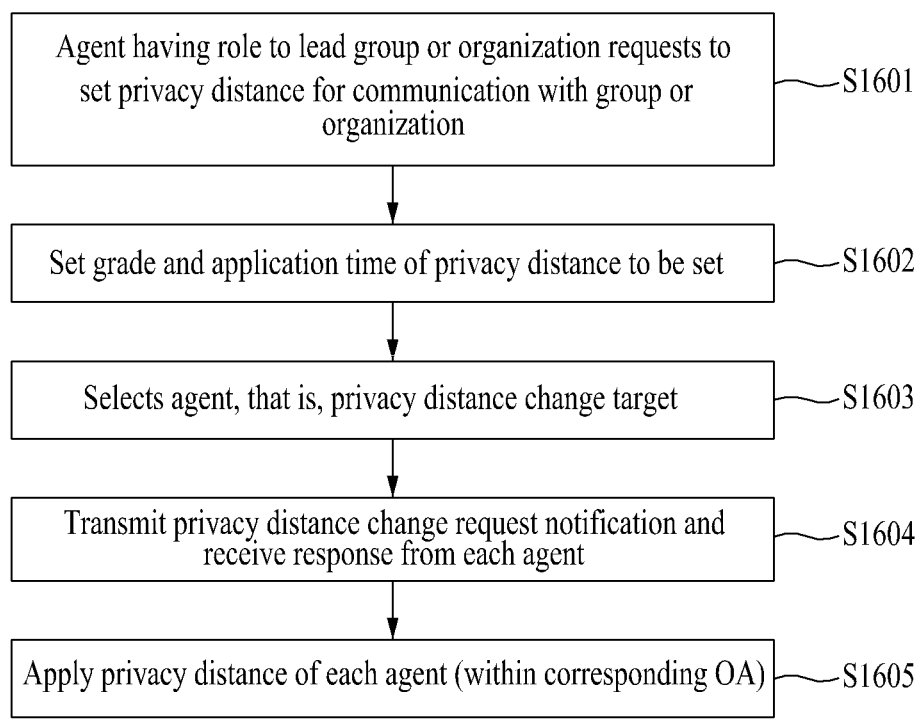
FIG. 16 is a flowchart illustrating an example of a privacy distance control process in an embodiment of the present disclosure.

FIG. 16 is a flowchart illustrating an example of a privacy distance control process in an embodiment of the present disclosure.

Referring to FIG. 16, in step S1601, the computer device 200 may request an agent having a role to lead a group or an organization to set a privacy distance for communication with the group or organization. A setting right to the privacy distance may be previously obtained from a VS platform.

In step S1602, the computer device 200 may set a grade and application time of the privacy distance to be set. If the privacy distance is applied, a separate mark or icon by which agents or an agent that has requested the privacy distance can be identified may be previously set.

In step S1603, the computer device 200 selects an agent, that is, a privacy distance change target.

In step S1604, the computer device 200 may receive a response from each agent by transmitting privacy distance change request notification to the agent, that is, a privacy distance change target.

In step S1605, the computer device 200 may apply the privacy distance within an OA to each agent from which a response has been received.

Figure 17:
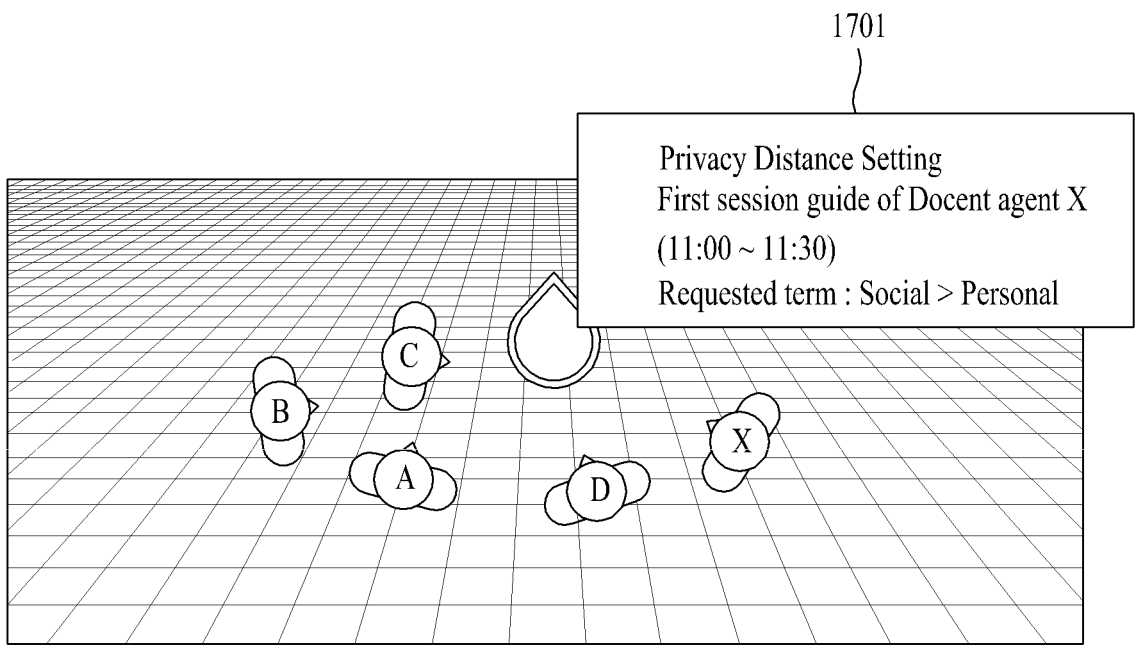
FIG. 17 illustrates an example of change request notification for an agent privacy distance in an embodiment of the present disclosure.

As illustrated in FIG. 17, if several user agents A, B, C, and D are present around a museum, that is, a DO in a VS, notification 1701 that requests a change in the privacy distance may be disposed in the VS in response to a request from a docent agent X. The notification 1701 may include configuration information (e.g., a privacy distance grade and an application time) for changing the privacy distance.

In order for a common agent to apply a privacy distance, a distance-based message push method of an agent in a specific area or a method of disposing a guide balloon related to a configuration in a VS in an interactive object form and enabling an individual agent to become close to a corresponding notification object and change a configuration through an interaction may be used.

As described above, according to embodiments of the present disclosure, privacy of an agent in a virtual space can be protected by providing a virtual space service to which a personal space of an agent (i.e., a distance between agents) has been applied.

The aforementioned device may be implemented as a hardware component, a software component, or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable recording medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

What is claimed is:

1. A method of performed by a computer device, the method comprising:
configuring, by at least one processor included in the computer device, a plurality of different privacy distances for guaranteeing a personal space based on a user agent in a virtual space;
setting, by the at least one processor, a privacy distance for the user agent as one of the privacy distances; and
performing, by the at least one processor, deactivation processing on another agent present within the set privacy distance or restricting approaching of another agent within the set privacy distance,
wherein each of the privacy distances is associated with a privacy level of the user agent to be protected,
wherein the method further comprises:
receiving a privacy distance change request for requesting a change of the set privacy distance of the user agent from a specific agent in the virtual space, the specific agent corresponding to a docent associated with the virtual space in which a privacy distance change authority has been obtained from an administrator of the virtual space; and
changing the set privacy distance with another privacy distance among the plurality of privacy distances in response to the privacy distance change request,
wherein the privacy distance change request from the specific agent includes information on the other privacy distance to be changed among the plurality of privacy distances and application time information on the other privacy distance,
wherein the changing comprises:
receiving a response to the privacy distance change request from the user agent; and
in response to receiving the response, applying the other privacy distance to the user agent for a period of time indicated by the application time information, and
wherein the changing comprises changing the set privacy distance with the other privacy distance that represents a privacy distance less than the set privacy distance among the plurality of privacy distances such that communications between the user agent and the specific agent corresponding to the docent are facilitated.

2. The method of claim 1, wherein the privacy distances include a first privacy distance corresponding to a basic display distance between agents and a second privacy distance less than the first privacy distance.

3. The method of claim 2, wherein the second privacy distance corresponds to a social distance within which an interaction with the user agent permitted by an administrator of the virtual space or the user agent is allowed, and the privacy distances further include a third privacy distance corresponding to a personal distance within which an interaction with an agent set as a personal grade by the user agent is allowed and less than the second privacy distance and a fourth privacy distance corresponding to an intimate distance within which an interaction with an agent set as an intimate grade by the user agent is allowed and less than the third privacy distance.

4. The method of claim 1, wherein the configuring comprises configuring each of the privacy distances based on a gaze direction of the user agent.

5. The method of claim 1, wherein the performing or the restricting comprises performing deactivation processing on an agent present within the set privacy distance or restricting approaching of another agent within the set privacy distance, and regardless of being present within the set privacy distance, performing activation processing on a first agent permitted by an administrator of the virtual space or the user agent and a second agent having a predetermined relationship with the user agent or permitting approaching the first agent or the second agent within the set privacy distance.

6. The method of claim 1, wherein the specific agent is associated with an agent group consisting of a plurality of agents including the user agent, the agent group is a group to receive guidance information on the virtual space from the specific agent corresponding to the docent, and the user agent is selected as an agent for which a privacy distance needs to be changed from among the plurality of agents.

7. The method of claim 1, wherein information on the other privacy distance and the application time information included in the privacy distance change request are displayed as a notification in the virtual space.

8. A non-transitory computer-readable recording medium storing instructions that when executed by a processor, cause the processor to perform the method of claim 1.

9. A computer device comprising:
at least one processor configured to execute computer-readable instructions included in a memory,
wherein the at least one processor is configured to configure a plurality of different privacy distances for guaranteeing a personal space based on a user agent in a virtual space, and to perform deactivation processing on another agent present within the set privacy distance or restrict approaching of another agent within the set privacy distance, and
each of the privacy distances is associated with a privacy level of the user agent to be protected,
wherein the at least one processor is configured to
receive a privacy distance change request for requesting a change of the set privacy distance of the user agent from a specific agent in the virtual space, the specific agent corresponding to a docent associated with the virtual space in which a privacy distance change authority has been obtained from an administrator of the virtual space; and
change the set privacy distance with another privacy distance among the plurality of privacy distances in response to the privacy distance change request,
wherein the privacy distance change request from the specific agent includes information on the other privacy distance to be changed among the plurality of privacy distances and application time information on the other privacy distance,
wherein the at least one processor is configured to the set privacy distance with the other privacy distance by
receiving a response to the privacy distance change request from the user agent, and
in response to receiving the response, applying the other privacy distance to the user agent for a period of time indicated by the application time information, and
wherein the at least one processor is configured to the set privacy distance with the other privacy distance that represents a privacy distance less than the set privacy distance among the plurality of privacy distances such that communications between the user agent and the specific agent corresponding to the docent are facilitated.

10. The computer device of claim 9, wherein the privacy distances include a first privacy distance corresponding to a basic display distance between agents and a second privacy distance less than the first privacy distance.

11. The computer device of claim 10, wherein the second privacy distance corresponds to a social distance within which an interaction with the user agent permitted by an administrator of the virtual space or the user agent is allowed, and
the privacy distances further include a third privacy distance corresponding to a personal distance within which an interaction with an agent set as a personal grade by the user agent is allowed and less than the second privacy distance and a fourth privacy distance corresponding to an intimate distance within which an interaction with an agent set as an intimate grade by the user agent is allowed and less than the third privacy distance.

12. The computer device of claim 9, wherein the configuring comprises configuring each of the privacy distances based on a gaze direction of the user agent.

13. The computer device of claim 9, wherein the at least one processor is configured to execute the performing or restricting by performing deactivation processing on an agent present within the set privacy distance or restricting approaching of another agent within the set privacy distance, and regardless of being present within the set privacy distance, performing activation processing on a first agent permitted by an administrator of the virtual space or the user agent and a second agent having a predetermined relationship with the user agent or permitting approaching the first agent or the second agent within the set privacy distance.

14. The computer device of claim 9, wherein the specific agent is associated with an agent group consisting of a plurality of agents including the user agent, the agent group is a group to receive guidance information on the virtual space from the specific agent corresponding to the docent, and the user agent is selected as an agent for which a privacy distance needs to be changed from among the plurality of agents.

15. The computer device of claim 9, wherein information on the other privacy distance and the application time information included in the privacy distance change request are displayed as a notification in the virtual space.

* * * * *